United States Patent Office
3,405,910
Patented Oct. 15, 1968

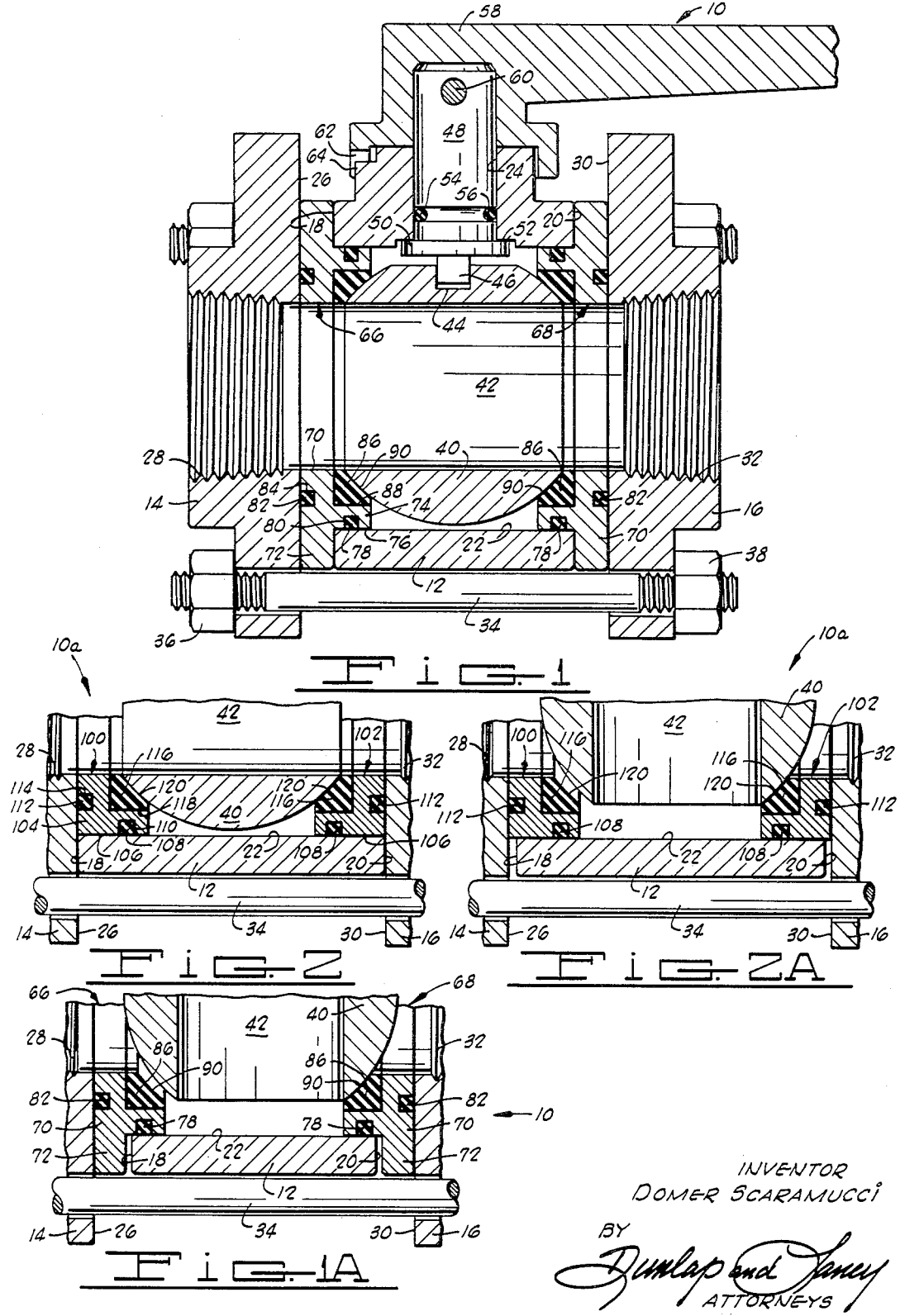

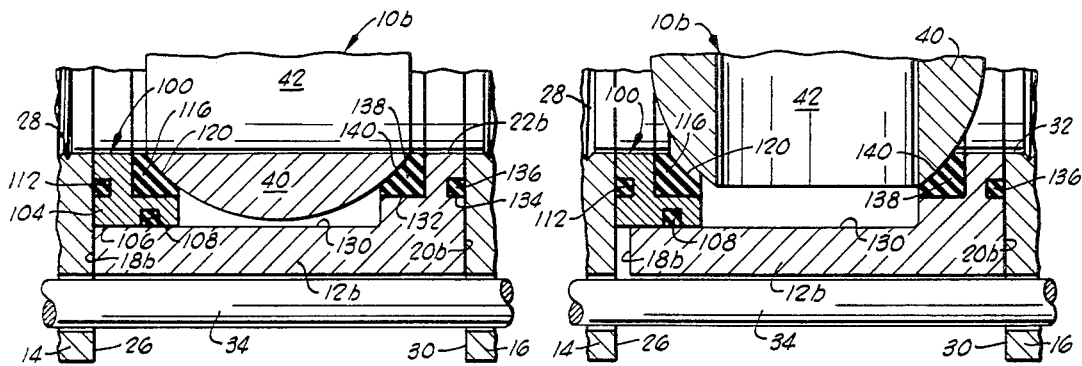
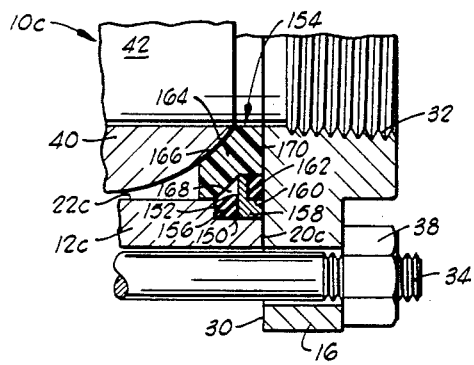
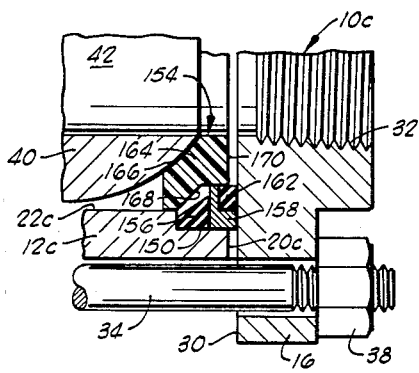
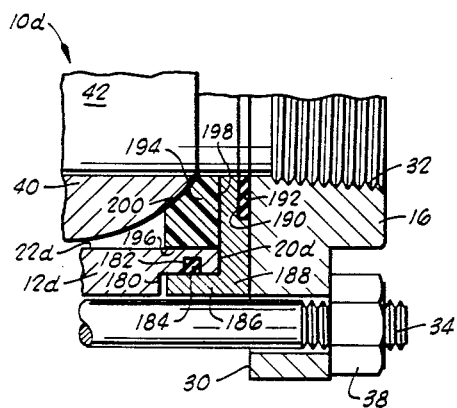
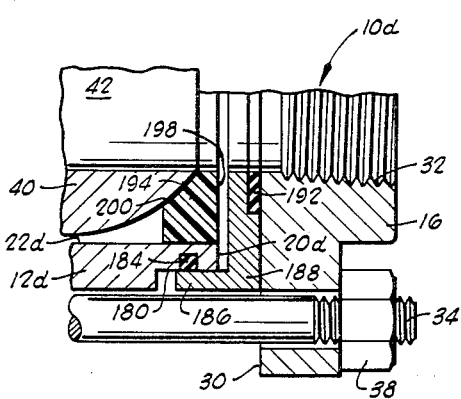

3,405,910
VALVES HAVING DIFFERENTIAL AREA
SEALS THEREIN
Domer Scaramucci, Oklahoma City, Okla., assignor to
Balon Corporation, Oklahoma City, Okla., a corporation of Oklahoma
Continuation-in-part of application Ser. No. 487,682,
Sept. 16, 1965. This application Apr. 4, 1966, Ser.
No. 540,037
7 Claims. (Cl. 251—148)

ABSTRACT OF THE DISCLOSURE

A valve which includes a valve body having a pair of end faces positioned opposite or facing the end faces on a pair of flanged connection members between which the body is positioned. The connection members are interconnected by a plurality of bolts which extend outside the valve body, and each includes an opening which is aligned with a bore extending through the valve body. One or a pair of seal structures are provided for establishing a seal between the valve body and the flanged connection members, and these structures are movable relatively to the valve body, and are configured so that fluid pressure acting outwardly from inside the valve body will cause them to follow the connection members as these members move away from the valve body when the bolts undergo expansion. A valve member is movably disposed in the bore of the valve body for opening and closing the valve.

This is a continuation-in-part of my copending application Ser. No. 487,682, filed Sept. 16, 1965.

This invention relates generally to improved valves. More particularly, but not by way of limitation, this invention relates to valves mounted between flanged connection members and having differential area seals therein for maintaining fluid-tight seals between the valve body and the flanged connection members.

Difficulty has been encountered in the past in the construction of valves for use between flanged connection members due to the tendency of the bolts, joining the flanges and holding the valve assembled, elongating under the effect of fluid pressure in the valve whereby leakage occurs between the valve body and the end faces of the flanged connection members. This problem has been more pronounced in valves constructed for extremely high pressure use and also in extremely large flow area valves.

As might be expected, the bolts joining the flanged connection members in the large size valves are generally relatively long in comparison to their diameter. Also, the large size valves generally have a greater surface area upon which the fluid pressure can act, whereby a greater axial load or strain is placed on the connecting bolts. Accordingly, the connecting bolts tend to elongate readily, permitting the flanged connection members to separate from the valve body. When this occurs, fluid in the valve can generally escape between the end faces of the valve body and the end faces on the flanged connection members.

While the connecting bolts used with smaller size valves that will be exposed to high fluid pressures are generally somewhat shorter, they will be subjected to extremely large forces tending to elongate the bolts. Thus, a similar problem exists with respect to the high pressure valves.

To alleviate the foregoing problem, some manufacturers of valves have utilized connecting bolts of excessively large diameter, thus, in at least some measure, reducing the elongation thereof. The use of the larger diameter connecting bolts requires the use of connecting members having larger flanges. Thus, it can be appreciated that the valves constructed in this manner are of greater weight and, therefore, of greater cost than necessary if the valves were constructed in accordance with this invention.

This invention provides an improved valve comprising: a valve body having a pair of end faces and a bore extending therethrough intersecting the end faces; a valve member disposed in the bore and moveable from a position wherein the bore is open to a position wherein the bore is closed; a connection member having an end face and an opening extending therethrough intersecting the end face, the opening being aligned with the bore when the connection member is assembled with the valve body; fastener means operably engaging the connection member to hold the valve body and connection member assembled; and, annular seal means encircling a portion of the bore and sealingly engaging the valve body and sealingly engaging the end face on the connection member along a circumference having a diameter smaller than the diameter of sealing engagement with said valve body, whereby fluid pressure in the valve body exerts a force on the seal means biasing the seal means toward the end face on the connection member.

One object of the invention is to provide an improved valve incorporating means for preventing flow of fluid between the valve body and connection member if elongation of the fastener means should occur.

Another object of the invention is to provide an improved valve incorporating means effecting a fluid-tight closure of the valve while simultaneously avoiding leakage of fluid from the valve should fluid pressure in the valve separate the connection members from the valve body.

One other object of the invention is to provide an improved valve incorporating sealing means therein that is responsive to fluid pressure in the valve to effectively maintain a seal between the valve body and the connection member even though elongation of the fastener means should occur.

A further object of the invention is to provide an improved valve that can be economically constructed.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball valve constructed in accordance with the invention;

FIG. 1A is a fragmentary, cross-sectional view of a portion of the ball valve of FIG. 1 showing the valve member in the closed position and the position of the various components thereof when elongation of the fasteners occurs;

FIG. 2 is a fragmentary, cross-sectional view similar to FIG. 1A, but illustrating another embodiment of ball valve also constructed in accordance with the invention;

FIG. 2A is a fragmentary, cross-sectional view similar to FIG. 2, but illustrating the valve member in the closed position and the various components of the valve in the position they occupy when elongation of the fastener means occurs;

FIG. 3 is a fragmentary, cross-sectional view similar to FIG. 1A, but illustrating another embodiment of ball valve also constructed in accordance with the invention;

FIG. 3A is a fragmentary, cross-sectional view similar to FIG. 3, but showing the valve member in the closed position and illustrating the various components of the valve in the position they occupy when elongation of the fastener means occurs;

FIG. 4 is an enlarged, fragmentary cross-sectional view of another embodiment of ball valve also constructed in accordance with the invention;

FIG. 4A is an enlarged, fragmentary cross-sectional view similar to FIG. 4, but illustrating the position of the various components of the valve when elongation of the fastener means occurs;

FIG. 5 is an enlarged, fragmentary cross-sectional view of another embodiment of ball valve also constructed in accordance with the invention; and, FIG. 5A is an enlarged, fragmentary cross-sectional view similar to FIG. 5, but illustrating the position of the various components of the valve when elongation of the fastener means occurs.

*Embodiment of FIG. 1*

Referring to the drawing and to FIG. 1 in particular, shown therein and generally designated by the reference character 10 is a ball valve constructed in accordance with the invention. As shown therein, the ball valve 10 includes a valve body 12 located between a flanged upstream connection member 14 and a flanged downstream connection member 16.

The valve body 12 includes an upstream end face 18, a downstream end face 20 and a bore 22 extending therethrough and intersecting the end faces 18 and 20. An opening 24 extends transversely through the valve body 12, intersecting the bore 22. The purpose of the opening 24 will be explained more fully hereinafter.

The flanged upstream connection member 14 includes an end face 26 disposed relatively adjacent the valve body 12 and a partially threaded opening 28 that extends therethrough intersecting the end face 26. It can be observed in FIG. 1 that the opening 28 is in axial alignment with the bore 22 in the valve body 12.

The flanged downstream connection member 16 includes an end face 30 and a partially threaded opening 32 extending therethrough intersecting the end face 30. The end face 30 on the connection member 16 is disposed relatively adjacent the valve body 12 and the opening 32 is in axial alignment with the bore 22 in the valve body 12.

A plurality of fasteners 34 extends through the flanged connection members 14 and 16. The fasteners 34 are threaded at each end to receive threaded nuts 36 and 38 that engage the flanged connection members 14 and 16, respectively, to hold the flanged connection members 14 and 16 assembled with the valve body 12.

A valve member 40, which is illustrated as having a spherical configuration, is disposed in the bore 22 of the valve body 12. The valve member has a port 42 extending therethrough and is provided on its upper exterior with a rectangular recess 44. The rectangular recess 44 is sized to receive a rectangular lower end 46 on a valve operating member 48.

It should be pointed out that the rectangular recess 44 is longer than the rectangular end 46 to permit movement of the valve member 40 relatively along the bore 22 when the valve member 40 is in the closed position (see FIG. 2). The structural relationship of the rectangular recess 44 and rectangular end 46 is well known to those skilled in the art.

The valve operating member 48 also includes an exterior flange 50 disposed in the bore 22 that is in engagement with a downwardly facing surface 52 formed in the valve body 12. The engagement between the flange 50 and the surface 52 limits the upward movement of the valve operating member 48 relative to the valve body 12.

The valve operating member 48 extends through the opening 24 and is provided with an annular groove 54 that encircles the valve operating member 48 within the opening 24. An annular seal 56 is disposed in the groove 54. The seal 56 sealingly engages the valve operating member 48 and the valve body 12 in the opening 24 to prevent leakage of fluid therebetween.

The upper end of the valve operating member 48 is connected with an operating handle 58 by a pin 60. The handle 58 is provided with one or more lug portions 62 (only one is shown in FIG. 1) that are arranged to engage spaced abutments 64 (only one is shown in FIG. 1) to limit the rotation of the operating handle 58 and the interconnected valve member 40 to approximately 90°.

Upstream and downstream seal assemblies 66 and 68, respectively, are disposed in the valve 10 adjacent the end faces 18 and 20 of the valve body 12, respectively. As clearly shown in FIG. 1, the seal assemblies 66 and 68 are identical in construction though oppositely disposed in the valve 10. In view of the identity of construction, only the upstream seal assembly 66 will be described in detail, it being understood that like reference characters denote like parts in the downstream seal assembly 68.

The seal assembly 66 includes an annular body 70 that is preferably constructed from a relatively rigid material. The annular body 70 includes a flange portion 72 extending radially outwardly therefrom and located between the end face 18 on the valve body 12 and the end face 26 on the upstream connection member 14.

An axial flange portion 74 of the body 70 extends into the bore 22 and has an outer periphery 76 sized to slidingly fit therein. An O-ring seal 78 is disposed in an annular groove 80 that is formed in the axial flange portion 74 adjacent the outer periphery 76 thereof. The seal 78 slidingly and sealingly engages the valve body 12 in the bore 22 for reasons that will become more apparent hereinafter.

An O-ring seal 82 is disposed in an annular groove 84 located in the body 70 adjacent the end face 26 of the upstream connecting member 14. It will be noted in FIG. 1 that the diameter of the annular groove 84 is less than the diameter of the bore 22, whereby the seal 82 sealingly engages the end face 26 along a circumference smaller than the diameter of the bore 22. The seal 82 is located relatively close to the opening 28, thereby limiting the area of the seal assembly 66 affected by fluid pressure in the valve 10 tending to force the seal assembly 66 away from the connection member 14 to the small annular area defined by the seal 82 and the opening 28.

An annular seal member 86 is located in a recess 88 formed in the body 70. The seal member 86 has a surface 90 thereon that is arranged to sealingly engage the exterior surface of the valve member 90. The body 12 is constructed so that the seal members 86 are in engagement with the valve member 40, when assembled, to hold the valve member 40 centered and to form an initial seal between the seal members 86 and the valve member 40.

*Operation of the embodiment of FIG. 1*

The valve 10 is illustrated in FIG. 1 in the open or flow position, that is, in the position wherein the flow port 42 extending through the valve member 40 is aligned with the bore 22 in the valve body and with the openings 28 and 32 in the flanged connection members 14 and 16, respectively. Should the fluid pressure in the valve 10 increase to a value sufficiently high to elongate the threaded fasteners 34, the flanged connection members 14 and 16 move relatively apart. When such movement occurs, fluid pressure enters the bore 22, exerting a force on the seal assemblies 66 and 68 forcing them relatively apart, that is, toward the flanged connection members 14 and 16 maintaining the O-ring seals 82 in sealing engagement with the end faces 26 and 30 on the flanged connection members 14 and 16, respectively.

The relative positions of the valve body 12, the flanged connection members 14 and 16, and the upstream and downstream seal assemblies 66 and 68 are substantially as illustrated in FIG. 1A. From viewing that figure, it will be apparent that no fluid can escape from within the bore 22 due to the sealing engagement maintained between the O-ring seals 78 and the valve body 12 in the bore 22.

When the valve 10 is closed, that is, when the valve member 40 is rotated to a position wherein the flow port 42 therein is disposed at approximately 90° relative to the elongation of the bore 22, fluid pressure acting through the opening 28 in the upstream connection member 14 exerts a force on the valve member 40, moving the valve member 40 relatively downstream until it engages the annular seal member 86 in the downstream seal assembly 68. If the fluid pressure is sufficiently high, the threaded fasteners 34 will elongate.

When this occurs, the fluid pressure in the valve body 12 exerts a force on the seal assemblies 66 and 68, moving them relatively apart and maintaining the O-ring seals 82 located therein in sealing engagement with the end faces 26 and 30 on the flanged connecting members 14 and 16, respectively. Also, it should be pointed out that the O-ring seals 78 maintain their sealing engagement with the valve body 12 and the bore 22, thereby preventing the escape of fluid from the bore 22.

As previously described, the relationship between the rectangular recess 44 in the valve member 40 and the rectangular end 46 on the valve operating member 48 permits the downstream movement of the valve member 40, when in the closed position, so that the valve member 40 maintains its sealing engagement with the surface 90 on the annular seal member 86 located in the downstream seal assembly 68. Thus, a fluid-tight downstream seal is formed in the valve 10 even though the valve member 40 may move away from the surface 90 on the annular seal member 86 located in the upstream seal assembly 66 as shown in FIG. 1A.

It should be emphasized that locating the O-ring seals 82 relatively adjacent the outside diameter of the openings 28 and 32 in the flanged connection members 14 and 16, respectively, reduces the effect of fluid pressure tending to force the seal assemblies 66 and 68 relatively together, that is, away from the respective connection members 14 and 16. As is clearly shown in FIGS. 1 and 1A, only the small annular areas on each of the seal assemblies 66 and 68 located between the seals 82 and the openings 28 and 32 are subjected to the effect of fluid pressure in the valve 10.

It should also be pointed out that the relative diameters of the O-ring seals 78 and 82 create on the seal assemblies 66 and 68 a differential area that is subjected to the effect of fluid pressure in the valve 10. As is clearly apparent from viewing FIGS. 1 and 1A, the fluid pressure in the valve 10 moves the seal assemblies 66 and 68 relatively apart since the fluid acts on the greater area of the seal assemblies 66 and 68 located within the bore 22 as defined by the O-ring seals 78. Thus, regardless of whether the elongation of the threaded fasteners 34 occurs when the valve 10 is in the open or closed position, the seal assemblies 66 and 68 move relatively apart to maintain the O-ring seals 82 in constant sealing engagement with the end faces 26 and 30 on the flanged connection members 14 and 16, respectively, to completely eliminate leakage of fluid from the valve 10.

*Embodiment of FIG. 2*

The fragmentary, cross-sectional view of FIG. 2 illustrates a modified form of ball valve that is generally designated by the reference character 10a and also constructed in accordance with the invention. Many of the components previously described with respect to the ball valve 10 are incorporated in the ball valve 10a and will, therefore, be designated by the same reference characters. It will be understood that the valve 10a includes the various operating components, such as the valve operating member 48 and the operating handle 58 illustrated in FIG. 1, although they are not shown in FIG. 2.

As shown in FIG. 2, the end faces 18 and 20 on the valve body 12 are in engagement with the end faces 26 and 30 on the upstream and downstream flanged connection members 14 and 16, respectively. The valve member 40 is disposed in the bore 22 as previously described in connection with the embodiment of FIG. 1.

Identically constructed upstream and downstream seal assemblies 100 and 102 are located in the valve 10a. As clearly shown in FIG. 2, the seal assemblies 100 and 102 are oppositely disposed in the bore 22 of the valve body 12. In view of their identical construction, only the upstream seal assembly 100 will be described in detail, it being understood that like reference characters will be applied to like parts of the downstream seal assembly 102.

The upstream seal assembly 100 includes a relatively rigid seal body 104 having an outer periphery 106 sized to slidingly fit within the bore 22. An O-ring seal 108 is disposed in an annular groove 110 formed in the seal body 104 adjacent the outer periphery 106. The O-ring seal 108 slidingly and sealingly engages the valve body 12 in the bore 22.

An O-ring seal 112 is disposed in an annular groove 114 also formed in the seal body 104. The groove 114 is located adjacent the end face 26 of the upstream flanged connection member 14. The O-ring seal 112 sealingly engages the end face 26. As clearly shown, the diameter of the annular groove 114 is less than the diameter of the bore 22 for purposes that will become more apparent hereinafter.

An annular seal member 116 is disposed in an annular recess 118 formed in the seal body 104 adjacent the valve member 40. The annular seal member 116 includes a surface 120 that is arranged to sealingly engage the exterior surface of the valve member 40.

Operationally, the valve 10a functions substantially the same as the valve 10. With the valve member 40 in the open position as illustrated in FIG. 2, the valve body 12 has been constructed of such a length as to provide a slight engagement between the surfaces 120 on the annular seal members 116 to maintain the valve member 40 in the center of the valve body 12 and to form an initial seal therewith.

If the pressure in the valve 10a reaches a sufficiently high value, the flanged connection members 14 and 16 are forced relatively apart, that is, to the position as illustrated in FIG. 2A elongating the fasteners 34. However, fluid pressure in the body 12 exerts a force on the seal assemblies 100 and 102, moving them relatively apart due to the differential area thereon as previously described in connection with the embodiment of FIG. 1 to maintain the O-ring seals 112 in sealing engagement with the end faces 26 and 30 on the flanged connecting members 14 and 16, respectively .

When the valve 10a is closed, that is, when the valve member 40 is rotated until the flow port 42 extending therethrough is disposed at a right angle to the bore 22 (see FIG. 2A), fluid pressure in the opening 28 exerts a force on the valve member 40, moving it relatively downstream with the exterior surface of the valve member 40 in sealing engagement with the surface 120 on the annular seal member 116 in the downstream seal assembly 102. If the pressure in the valve body 12 reaches a sufficiently high magnitude, the flanged connection members 14 and 16 are forced relatively apart elongating the threaded fasteners 34 as previously described.

Also as previously described, the fluid pressure in the valve body 12 exerts a force on the seal assemblies 100 and 102 moving them relatively apart as the fasteners 34 elongate. Thus, the O-ring seals 112 are in sealing engagement with the end faces 26 and 30 on the flanged connection members 14 and 16, respectively at all times. It should also be pointed out that no fluid can escape between the outer peripheries 106 of the seal assemblies 100 and 102 due to the sealing engagement between the O-ring seals 108 and the valve body 12 in the bore 22.

Thus, it can be appreciated that the seal assemblies 100 and 102 are responsive to fluid pressure in the valve to constantly maintain the seals 112 in sealing engagement with the flanged connecting members 14 and 16 regardless of the position of the valve member 40. The seal assemblies 100 and 102 are effective to prevent the leakage of fluid from the valve 10a even though elongation of the threaded fasteners 34 occurs.

It should be emphasized that the seal assemblies 100 and 102 are moved toward the respective connection members 14 and 16 by fluid pressure in the valve 10a due to the differential areas defined thereon by the seals 112 and the seals 108. Locating the seals 112 as described limits the area of the seal assemblies 100 and 102 acted on by fluid pressure tending to oppose the relative outward movement of the seal assemblies 100 and 102 to the small annular area defined by the openings 28 and 34 and the seals 112.

Embodiment of FIG. 3

The fragmentary, cross-sectional view of FIG. 3 illustrates another embodiment of ball valve generally designated by the reference character 10b that is also constructed in accordance with the invention. The ball valve 10b incorporates previously described components that will be identified by the same reference characters previously used.

The ball valve 10b includes a valve body 12b having an end face 18b disposed adjacent the end face 26 on the upstream flanged connection member 14, an end face 20b that engages the end face 30 on the downstream flanged connection member 16, and a bore 22b that extends through the body 12b. The bore 22b is provided with a counterbore 130 that extends for a considerable distance into the valve body 12b from the end face 18b.

An annular recess 132 is formed in the valve body 12b at the termination of the counterbore 130. The recess 132 is of larger diameter than the bore 22b but of smaller diameter than the counterbore 130.

An annular groove 134 is formed in the end face 20b of the valve body 12b. An O-ring seal 136 is disposed in the annular groove 134 and sealingly engages the end face 30 of the connection member 16 along a circumference having a diameter that is less than the diameter of the counterbore 130.

An annular seal member 138 is disposed in the annular recess 132. The seal member 138 includes a surface 140 that is arranged to sealingly engage the exterior surface of the valve member 40.

As clearly illustrated in FIG. 3, the previously described upstream seal assembly 100 is disposed in the counterbore 130 with the outer periphery 106 thereof sized to slidingly fit therein. The O-ring seal 108 carried by the seal assembly 100 is in sliding and sealing engagement with the valve body 12b in the counterbore 130.

The O-ring seal 112, also carried by the seal assembly 100, is in sealing engagement with the end face 26 on the upstream flanged connection member 14. As previously described, the outside diameter of the O-ring seal 112 is less than the diameter of the O-ring seal 108, that is, smaller than the diameter of the counterbore 130, whereby the seal assembly 100 has a differential area exposed to the action of fluid pressure in the valve 10b.

The annular seal member 116, also carried by the seal assembly 100, has the surface 120 thereon arranged to sealingly engage the valve member 40. The valve body 12b is constructed so that the surface 120 on the seal member 116 and the surface 140 on the seal member 138 engages the exterior surface of the valve member 40, upon assembly, to initiate sealing engagement therewith and to hold the valve member 40 centered in the valve body 12b as illustrated in FIG. 3.

With the valve 10b in the open position, the various components of the valve remain in the position illustrated in FIG. 3 until the fluid pressure is sufficiently great to force the flanged connection members 14 and 16 relatively apart elongating the threaded fasteners 34. When this occurs, the flanged connection members 14 and 16, the seal assembly 100, and the valve body 12b assume the position illustrated in FIG. 3A.

As shown therein, the end face 18b on the valve body 12b has separated from the end face 26 of the upstream connection member 14. The separation results from the fluid pressure in the valve acting upon the large interior surface of the valve body 12b as compared to the small annular area located between the O-ring seal 136 and the opening 32 in the downstream connection member 16. Thus, the O-ring seal 136 is maintained in tight sealing engagement with the end face 30 of the connection member 16 even though elongation of the threaded fasteners 34 occurs.

The seal assembly 100 is displaced toward the end face 26 on the flanged connection member 14 by the fluid pressure in the valve body 12b. Again, it can be seen that the area of the seal assembly 100 as defined by the O-ring seal 108 is greater than the annular space between the O-ring seal 112 and the opening 28 extending through the flanged connection member 14. Thus, the seal assembly 100, due to its differential area, shifts under the influence of fluid pressure to maintain the O-ring seal 112 in constant sealing engagement with the end face 26 on the connection member 14.

When the valve member 40 is rotated to the closed position as illustrated in FIG. 3A, fluid pressure in the opening 28 exerts a force thereon, moving the valve member 40 relatively toward the downstream flanged connection member 16. The downstream movement of the valve member 40 continues until the exterior surface thereof engages the annular seal member 138. When this occurs, a fluid-tight downstream seal is effected in the valve 10b, providing a complete closure of the valve.

It should also be pointed out that fluid cannot escape from the couterbore 130 past the seal assembly 100 due to the sealing engagement of the O-ring seal 108 with the valve body 12b. The seal assembly 100 is illustrated as being disposed in the counterbore 130, but it should be understood that any of the seal assemblies described herein can be utilized in lieu of the seal assembly 100.

Embodiment of FIG. 4

The fragmentary, cross-sectional view of FIG. 4 illustrates another embodiment of ball valve generally designated by the reference character 10c and also constructed in accordance with the invention. The valve 10c also includes many of the same components previously described and such components will be designated by the same reference characters previously used. It will be understood that the valve 10c also includes the necessary valve operating components previously described in connection with the embodiment of FIG. 1.

As illustrated in FIG. 4, the valve 10c includes a valve body 12c having an end face 20c adjacent the end face 30 on the downstream connection member 16. A bore 22c extends through the valve body 12c intersecting the upstream end face (not shown) and the downstream end face 20c.

A counterbore 150 is formed in the valve body 12c adjacent the end face 20c. The counterbore 150 forms an outwardly facing annular shoulder 152. Disposed partially in the counterbore 150 and partially in the bore 22c is a downstream seal assembly generally designated by the reference character 154. It will understood that an identical upstream seal assembly (not shown) can be utilized in the valve 10c if desired.

The seal assembly 154 includes a relatively soft seal member 156 disposed in the counterbore 150 in engagement with the shoulder 152. A relatively rigid seal body 158 is slidingly disposed in the counterbore 150 between the seal member 156 and the end face 30 on the flanged connection member 16. The combined length of the seal member 156 and the seal body 158 is greater than the depth of the counterbore 150 so that the seal member 156 is compressed or deformed upon assembly of the valve 10c.

The seal body 158 has an annular recess 160 therein adjacent the end face 30. A resilient annular seal 162 is disposed in the recess 160 in sealing engagement with the end face 30.

The seal assembly 154 also includes an annular seal member 164 having a surface 166 thereon arranged to sealingly engage the exterior surface of the valve member 40. As clearly shown in FIG. 4, the seal member 164 is provided with an annular recess 168 that encompasses the counterbore 150. A surface 170 on the seal member 164 is arranged to supportingly engage the end face 30 on the connection member 16. The outer periphery of the seal member 164 is slidingly disposed in the bore 22c.

With the valve member 40 in the open position and fluid flowing through the valve 10c, it can be seen that the fluid pressure is exerted on the connection member 16 and also on the upstream flanged connection member (not shown) along an area defined by the opening 32 and the seal 162. If the pressure is sufficiently high, the threaded fastener 34 elongates permitting movement of the flanged connection members relatively to the position illustrated in FIG. 4A.

When this occurs, the seal body 158 and the seal 162 move relatively outwardly to maintain their engagement with the end face 30 of the connection member 16. The movement of the seal body 158 and seal 162 occurs as a result of both the resiliency of the mechanically deformed seal member 156 and due to the effect of fluid in the annular recess 168 of the seal member 164. As can be clearly seen in FIG. 4A, fluid in the recess 168 acts across the full area of the seal 156 and seal body 158 while the fluid pressure tending to separate the seal body 158 and seal 162 from the flanges acts only across a very small area of the seal 162. Thus, the assembly of the seal 156, seal body 158 and seal 162 form a differential area piston-like unit that is constantly biased toward the connection member 16 to maintain the seal 162 in sealing engagement therewith.

Although not shown, it will be apparent to those skilled in the art that the valve member 40 when in the closed position moves relatively toward the downstream connection member 16 under the influence of pressure in the opening 28 (see FIG. 1). As the downstream movement of the valve member 40 continues, the seal member 164 is carried therewith until the surface 170 thereon engages the end face 30 of the downstream flanged connection member 16. When this occurs, movement of the valve member 40 is terminated and a fluid-tight downstream seal is formed in the valve 10c.

From the foregoing it can be appreciated that the valve 10c includes the seal assembly 154 that maintains a fluidtight seal between the valve body 12c and the flange connection member 16 (and also the connection member 14 though it is not shown) regardless of whether the valve member 40 is in the open or closed position. It should be emphasized that such sealing arrangement is attained due to the small effective area of the seal 162 exposed to fluid pressure in the valve 10c as compared to the effective sealing diameter defined by the sealing engagement between the outside diameter of the seal member 156 with the valve body 12c in the counterbore 150. Thus the seal assembly 154, that is, the seal 162 therein, is maintained in fluid-tight sealing engagement with the end face 30 on the connection member 16 by fluid pressure in the valve 10c.

*Embodiment of FIG. 5*

The fragmentary cross-sectional view of FIG. 5 illustrates another embodiment of ball valve generally designated by the reference character 10d and also constructed in accordance with the invention. Components of the valve 10d previously described in connection with the other embodiments will be designated by the same reference characters previously used. It will be understood that the valve 10d may also include a similar upstream arrangement although not illustrated in FIG. 5 or 5A.

As shown in FIG. 5, the valve 10d includes a valve body 12d having a downstream end face 20d and an upstream end face (not shown). A bore 22d extends through the valve body 12d intersecting the upstream end face (not shown) and the downstream end face 20d. The valve body 12d also includes an annular recess 180 encircling the end face 20d.

An annular groove 182 is formed in the valve body 12d adjacent the annular recess 180. An O-ring seal 184 is disposed in the annular groove 182 in sliding and sealing engagement with an axial flange 186 of a relatively rigid seal body 188.

The seal body 188 is also partially disposed between the end face 20d on the valve body 12d and the end face 30 on the downstream connection member 16. An annular recess 190 is formed in the seal body 188 adjacent the end face 30. An annular seal member 192 is disposed in the annular recess 190 in sealing engagement with the end face 30 adjacent the opening 32 that extends through the connection member 16.

An annular seal member 194 has an outer periphery 196 slidingly disposed in the bore 22d. The annular seal member 194 also includes a surface 198 arranged to supportingly engage a portion of the seal body 188. A surface 200 on the seal member 194 is arranged to sealingly engage the exterior of the valve member 40.

With the valve member 40 in the open position, the various components of the valve 10d remain in the position illustrated in FIG. 5 until the magnitude of the fluid pressure is sufficiently high to force the connection members apart elongating the threaded fasteners 34. When this occurs, the components of the valve 10d assume the position illustrated in FIG. 5A.

As clearly shown in FIG. 5A, no fluid can escape from the valve 10d between the valve body 12d and the connection member 16 due to the sealing engagement of the seal member 192 with the end face 30 of the connection member 16 and due to the sealing engagement of the O-ring seal 184 with the axial flange 186 on the seal body 188.

The seal member 192 is maintained in sealing engagement with the end face 30 since the fluid pressure in the valve body 12d acts across the entire inside surface of the seal body 188 as defined by the O-ring seal 184. The only opposing force that may be generated by the fluid pressure results from the encroachment of the fluid for a very short distance between the seal member 192 and the end face 30. Manifestly, if a perfect seal is formed between the seal member 192 and the end face 30 there will be no opposing force generated.

With the valve member 40 in the closed position (not shown), that is, with the valve member 40 rotated until the port 42 extending therethrough is disposed at a substantially right angle to the bore 22d, the valve member 40 is moved relatively toward the connection member 16 by fluid pressure in the opening 28 (see FIG. 1). The movement of the valve member 40 is transmitted, through the surface 200, to the seal member 194. The downstream movement of the seal member 40 and the seal 194 continues until the surface 198 on the seal member 194 engages the inside surface of the seal body 188. When this occurs, a fluid-tight downstream seal is formed between the valve member 40 and the seal member 194, thereby providing a complete closure of the valve 10d.

The valve 10d is effective to constantly maintain a fluid-tight seal between the valve body 12d and the connection member 16 regardless of the position of the valve member 40 due to the differential area formed on the seal body 188 by the relatively large diameter O-ring seal 184 as compared to the relatively small diameter of the seal member 192.

From the foregoing detailed description of the various embodiments of valve constructed in accordance with the invention, it is believed apparent that each of the valves described can be constructed with smaller diameter threaded fasteners and smaller flanged connecting members, thereby reducing the overall weight and, ultimately, the cost of the valves. Such a reduction in weight and cost is possible due to the effectiveness of the differential area seals in preventing leakage of fluid from the valve even though some elongation of the threaded fasteners may occur. Also, valves manufactured in accordance with the invention can be utilized with positive assurance that no fluid will leak therefrom even if some elongation of the threaded fasteners should occur.

It will also be understood that the embodiments described in detail hereinbefore are presented by way of example only and that many changes and modifications can be made thereto without departing from the spirit of the invention or from the scope of the annexed claims.

What I claim is:

1. A valve comprising:
   a valve body having an upstream end face, a downstream end face, a bore extending therethrough intersecting said end faces, and a counterbore adjacent the downstream end face;
   a valve ball disposed in said bore and having a port extending therethrough, said valve ball being rotatable in said bore from an open position wherein said port is aligned with said bore to a closed position wherein said port is disaligned with respect to said bore, said valve ball being movable relatively along said bore when said valve ball is in the closed position;
   a connection member having an end face and an opening extending therethrough intersecting the end face thereof, said opening being aligned with said bore when said connection member is assembled with said valve body adjacent one of the end faces of said valve body;
   fastener means operably engaging said connection member for holding said connection member and valve body assembled; and
   annular seal means encircling a portion of said bore and sealingly engaging said valve body and sealingly engaging the end face on said connection member along a circumference having a diameter smaller than the diameter of the sealing engagement of said seal means with said body, whereby fluid pressure in said valve body exerts a force on said seal means biasing said seal means toward the end face on said connection member, said seal means comprising:
      a first annular seal member disposed in said counterbore in sealing engagement with said valve body;
      a relatively rigid annular member slidingly disposed in said counterbore and having an annular recess therein located adjacent the inner periphery thereof and adjacent the end face on said connection member, said recess having an outside diameter smaller than the diameter of said counterbore;
      a second annular seal member disposed in said recess in sealing engagement with the end face on said connection member, whereby fluid pressure in said valve body biases said rigid annular member and said second annular seal member toward said connection member; and,
      a third annular seal member having an outside diameter sized to slidingly fit into said bore, and further having
         a first surface arranged to sealingly engage said valve ball; and
         a second surface engageable with the end face on said connection member.

2. A valve comprising:
   a valve body having an upstream end face, a downstream end face, a bore extending therethrough intersecting said end faces, and an exterior annular recess on said downstream end face encircling said bore; and
   a valve ball disposed in said bore and having a port extending therethrough, said valve ball being rotatable in said bore from an open position wherein said port is aligned with said bore to a closed position wherein said port is disaligned with respect to said bore, said valve ball being movable along said bore when said valve ball is in the closed position;
   a connection member having an end face and an opening extending therethrough intersecting the end face thereof, said opening being aligned with said bore when said connection member is assembled with said valve body adjacent one of the end faces of said valve body;
   fastener means operably engaging said connection member for holding said connection member and valve body assembled; and,
   annular seal means encircling a portion of said bore and sealingly engaging said valve body and sealingly engaging the end face on said connection member along a circumference having a diameter smaller than the diameter of sealing engagement with said body, whereby fluid pressure in said valve body exerts a force on said seal means biasing said seal means toward the end face on said connection member, said seal means comprising:
      a relatively rigid annular member disposed between the end face on said connection member and one of the end faces on said valve body and having an axial flange portion slidingly disposed in said annular recess;
      a first seal member encircling said valve body forming a seal between said valve body and the axial flange portion of said rigid annular member;
      a second seal member carried by said rigid annular member arranged to sealingly engage the end face on said connection member, said second seal member having an outside diameter smaller than the outside diameter of said first seal member, whereby said rigid annular member and second seal member are biased by fluid pressure in said valve toward said connection member; and
      a third seal member slidingly disposed in said bore having a first surface thereon arranged to sealingly engage said valve ball and a second surface thereon arranged to engage said rigid annular member.

3. The valve of claim 2 wherein
   said valve body includes an annular groove adjacent said annular recess and said first seal member is disposed in said first annular groove in sliding and sealing engagement with the annular portion of said rigid annular member; and
   said rigid annular member includes an annular recess adjacent the end face on said connection member and said second annular seal member is disposed in the annular recess in said rigid annular member.

4. A valve comprising:
   a valve body having an upstream end face, a downstream end face, a bore extending therethrough intersecting said end faces, and a counterbore in each end of said bore adjacent said end faces;
   a valve member disposed in said bore and movable from a position wherein said bore is open to a position wherein said bore is closed;
   upstream and downstream connection members, each of said connection members having an end face and an opening extending therethrough intersecting the end face of the respective connection member, said openings in said connection members being aligned with said bore when said connection members are assembled with said valve body;

a plurality of elongated fasteners connecting said connection members to hold said connection members assembled with said valve body;

annular upstream seal means encircling a portion of said bore and sealingly engaging said valve body and sealingly engaging the end face on said upstream connection member along a circumference having a diameter smaller than the diameter of sealing engagement of said seal means with said valve body, whereby fluid pressure in said valve body exerts a force on said upstream seal means biasing said upstream seal means toward the end face on said upstream connection member;

annular downstream seal means encircling a portion of said bore and sealingly engaging said valve body and sealingly engaging the end face on said downstream connection member along a circumference having a diameter smaller than the diameter of sealing engagement of said downstream seal means with said valve body, whereby fluid pressure in said bore exerts a force on said downstream seal means biasing said downstream seal means toward the end face on said downstream connection member, said annular upstream seal means and said annular downstream seal means each comprising:

- a first annular seal member disposed in one said counterbore in sealing engagement with said valve body;
- a relatively rigid annular member slidingly disposed in the same counterbore as said first annular seal member and having an annular recess therein located adjacent the inner periphery thereof and adjacent the end face on said one connection member, said recess having an outside diameter smaller than the diameter of said last-mentioned counterbore;
- a second annular seal member disposed in said recess in sealing engagement with the end face on the nearest one of said connection members, whereby fluid pressure in said valve body biases said rigid annular member and second annular seal member toward said nearest one of said connection members; and,
- a third annular seal member having an outside diameter sized to slidingly fit into said bore, and further having
  - a first surface arranged to sealingly engage said valve ball, and
  - a second surface engageable with the end face on the nearest one of said connection members.

5. A valve comprising:
a valve body having an upstream end face, a downstream end face, an exterior annular recess adjacent each of said end faces, and a bore extending therethrough intersecting said end faces;

a valve member disposed in said bore and movable from a position wherein said bore is open to a position wherein said bore is closed;

upstream and downstream connection members, each of said connection members having an end face and an opening extending therethrough intersecting the end face of the respective connection member, said openings being aligned with said bore when said connection members are assembled with said valve body;

a plurality of elongated fasteners connecting said connection members to hold said connection members assembled with said valve body;

annular upstream seal means encircling a portion of said bore and sealingly engaging said valve body and sealingly engaging the end face on said upstream connection member along a circumference having a diameter smaller than the diameter of sealing engagement of said upstream seal means with said valve body, whereby fluid pressure in said valve body exerts a force on said upstream seal means biasing said upstream seal means toward the end face on said upstream connection member; and annular downstream seal means encircling a portion of said bore and sealingly engaging said valve body and sealingly engaging the end face on said downstream connection member along a circumference having a diameter smaller than the diameter of sealing engagement of said downstream seal means with said valve body, whereby fluid pressure in said bore exerts a force on said downstream seal means biasing said downstream seal means toward the end face on said downstream connection member, each of said seal means comprising:

- a relatively rigid annular member disposed between the end face on one of said connection members and one of the end faces on said valve body and having an axial flange portion slidingly disposed in one of said annular recesses;
- a first seal member encircling said valve body and forming a seal between said valve body and the axial flange portion of said rigid annular member;
- a second seal member carried by said rigid annular member arranged to sealingly engage the end face on the adjacent connection member, said second seal member having an outside diameter smaller than the outside diameter of said first seal member whereby said rigid annular member and second seal member are biased by fluid pressure in said valve toward the adjacent connection member; and
- a third seal member slidingly disposed in said bore having a first surface thereon arranged to sealingly engage said valve member and a second surface thereon arranged to engage said rigid annular member.

6. A valve comprising:
a rigid valve body having an upstream end face, a downstream end face, and a cylindrical bore extending therethrough intersecting said end faces;

a valve ball disposed in said bore and having a port extending therethrough, said valve ball being rotatable in said bore from an open position wherein said port is aligned with said bore, to a closed position wherein said port is disaligned with respect to said bore, said valve ball being movable along said bore when said valve ball is in the closed position;

a first, rigid flanged connection member having an end face facing and opposite the upstream end face of said valve body and having an opening extending therethrough, said opening in said connection member being aligned with said bore;

a second, rigid flanged connection member having an end face facing and opposite the downstream end face of said valve body and having an opening extending therethrough, said opening in said second connection member being aligned with said bore;

elongated bolts interconnecting the flanges of said connection members and positioned outside said valve body for drawing said flanged connecting members toward each other and against the respective end faces of said rigid valve body;

a first, relatively rigid annular seal body encircling a first portion of said bore and having a first portion extending axially in said bore and slidable axially in said bore, and a second portion extending radially inwardly relative to said bore and contacting said first rigid, flanged connection member from said opening therethrough radially outwardly at least to a point in axial alignment with said valve body, said first portion of said first relatively rigid annular seal body having a first annular groove therein adjacent said valve body and spaced axially inwardly in said bore from the upstream end face of said valve body by a distance greater than the distance that said first rigid flanged connection member may move from said valve body due to expansion of said bolts during operation of said valve whereby said first flanged connection member can move axially away from said valve body followed by said first rigid annular body without said first annular groove moving out of said bore, and said second portion of said first relatively rigid annular seal body having a second annular groove therein adjacent and facing the end face of said first, rigid flanged connection member, said second annular groove defining an area within it which is less than the cross-sectional area of said bore whereby fluid pressure acting on said first relatively rigid annular seal body from inside said valve body will be greater than fluid pressure acting from outside said body on the portion of said first relatively rigid annular seal body located radially inwardly of said second groove;

a first resilient seal member in said first groove sealingly engaging said valve body and slidable in said bore with said first portion of said first rigid annular seal body;

a second resilient seal member in said second groove sealingly engaging the end face of said first rigid, flanged connection member;

a first valve ball resilient seal member secured to said first relatively rigid annular seal body and positioned thereon for sealingly contacting said valve ball while concurrently spacing said first relatively rigid annular seal body from said valve ball;

a second relatively rigid annular seal body encircling a second portion of said bore and having a first portion extending axially in said bore and slidable axially in said bore, and a second portion extending radially inwardly relative to said bore and contacting said second rigid, flanged connection member from said opening radially outwardly at least to a point in alignment with said body, said first portion having a first annular groove therein adjacent said valve body and spaced axially inwardly in said bore from the upstream end face of said valve body by a distance greater than the distance which said second rigid, flanged connection member can move from said body in an axial direction upon expansion of said bolts during operation of said valve whereby said second rigid, flanged connection member can move axially from said valve body followed by said second relatively rigid annular seal body without the first annular groove in said second relatively rigid annular seal body leaving said bore, and said second portion of said second relatively rigid seal body having a second annular groove therein adjacent and facing the end face of said second, rigid, flanged connection member, said second annular groove in said second relatively rigid annular seal body defining an area within it which is less than the cross-sectional area of said bore whereby fluid pressure acting on said second relatively rigid annular seal body from inside said valve body will be greater than fluid pressure acting from outside said body on the portion of said second relatively rigid annular seal body located radially inwardly of the second groove therein;

a third resilient seal member in the first groove in said second relatively rigid annular seal body sealingly engaging said valve body and slidable in said bore with said first portion of said second relatively rigid annular seal body;

a fourth resilient seal member in said second groove in said second relatively rigid annular seal body sealingly engaging the end face of said second rigid flanged connection member; and a second valve ball resilient seal member secured to said second relatively rigid annular seal body and positioned thereon for sealingly contacting said valve ball while concurrently spacing said second relatively rigid annular seal body from said valve ball.

7. A valve comprising:

a valve body having an upstream end face, a downstream end face, a bore extending therethrough intersecting said end faces, and a counterbore in said body adjacent the downstream end face thereon;

a valve member disposed in said bore and movable from a position wherein said bore is open to a position wherein said bore is closed;

a connection member having an end face and an opening extending therethrough intersecting the end face thereof, said opening in said connection member being aligned with said bore when said connection member is assembled with said valve body adjacent one of the end faces thereof;

fastener means operably engaging said connection member for holding said connection member and valve body assembled;

annular seal means encircling a portion of said bore and sealingly engaging said valve body and sealingly engaging the end face on said connection member along a circumference having a diameter smaller than the diameter of sealing engagement of said annular seal means with said body, whereby fluid pressure in said valve body exerts a force on said annular seal means biasing said seal means toward the end face on said connection member, said annular seal means comprising:

a first annular seal member disposed in said counterbore in sealing engagement with said valve body;

a relatively rigid annular member slidingly disposed in said counterbore and having an annular recess therein located adjacent the inner periphery thereof and adjacent the end face on said connection member, said recess having an outside diameter smaller than the diameter of said counterbore;

a second annular seal member disposed in said recess in sealing engagement with the end face on said connection member, whereby fluid pressure in said valve body biases said rigid annular member and second annular seal member toward said connection member; and a third annular seal member having an outside diameter sized to slidingly fit into said bore, and further having
a first surface arranged to sealingly engage said valve member, and
a second surface engageable with the end face on said connection member.

References Cited

UNITED STATES PATENTS

| | | | |
|---|---|---|---|
| 2,895,496 | 7/1959 | Sanctuary | 251—151 XR |
| 3,056,577 | 10/1962 | Bulisek | 251—315 |
| 3,156,475 | 11/1964 | Gerard | 277—58 |
| 3,157,380 | 11/1964 | Sivyer | 251—315 XR |
| 3,182,952 | 5/1965 | Montesi | 251—148 |
| 3,199,528 | 8/1965 | Oetjens | 251—316 XR |
| 3,202,175 | 8/1965 | Dumm | 137—454.2 |
| 3,211,421 | 10/1965 | Johnson | 251—315 |

ALAN COHAN, *Primary Examiner.*

H. W. WEAKLEY, *Assistant Examiner.*